United States Patent [19]

Paul, 3rd

[11] 4,060,570

[45] Nov. 29, 1977

[54] CURABLE LIQUID POLYSULFIDE POLYMER BASED SEALANTS

[75] Inventor: Henry Neil Paul, 3rd, Blue Bell, Pa.

[73] Assignee: Thiokol Corporation, Newtown, Pa.

[21] Appl. No.: 684,990

[22] Filed: May 10, 1976

[51] Int. Cl.$^2$ .................. C08L 9/00; C08L 23/22; C08L 23/20
[52] U.S. Cl. ..................... 260/889; 260/897 A; 260/79; 260/79.1; 260/42.36; 260/42.39; 260/42.42; 428/419; 428/441
[58] Field of Search ............... 260/897, 889, 42.36, 260/42.39, 42.42, 79, 79.1; 428/419, 441

[56] References Cited

U.S. PATENT DOCUMENTS

| | | | |
|---|---|---|---|
| 2,466,963 | 4/1949 | Patrick et al. | 260/79.1 |
| 2,995,539 | 8/1961 | Barker et al. | 260/897 X |
| 3,351,571 | 11/1967 | Grace et al. | 260/4 |

Primary Examiner—Carman J. Seccuro
Attorney, Agent, or Firm—Stanley A. Marcus; Royal E. Bright

[57] ABSTRACT

Curable liquid polysulfide polymer based sealants containing butyl or polybutene polymers or mixtures thereof as adhesive additives. The compositions show improved adherence to glass in the presence of moisture and ultra-violet light.

23 Claims, No Drawings

CURABLE LIQUID POLYSULFIDE POLYMER BASED SEALANTS

BACKGROUND OF THE INVENTION

The use of curable liquid polysulfide polymer based sealant compositions because of their durability and imperviousness to various agents which are known to affect other caulking compounds has long been practiced. For all their desirable properties, however, it has long been desired to improve the ability of these sealants to adhere more firmly to certain substrates such as glass in the presence of moisture and ultra-violet light. Improved adherence would allow more extensive use of these compounds in the fabrication of insulating glass units permitting the use of "formed in place" instead of "preformed" gaskets. The present invention relates to additives which supply greater adhesion to glass to the polysulfide polymer based caulks in which they are employed, to compositions formulated employing these additives, to processes for their preparation and use, and the articles of manufacture formed thereby.

SUMMARY OF THE INVENTION

The invention provides a curable liquid polysulfide polymer based sealant which comprises:
a. a curable liquid polysulfide polymer;
b. a polybutyl polymer, a polybutene polymer, or a mixture thereof as an adhesive additive; and
c. an oil absorbent filler.

The tangible embodiments of this composition aspect of the invention possess the inherent applied use characteristics of being useable as sealant compositions having greater adhesion to glass after exposure to moisture and ultra-violet light. In addition those embodiments in which the polybutyl or polybutene polymer is not incorporated as a water based latex show improved water vapor transmission characteristics.

The invention further provides a process for the enhancement of adhesiveness to glass in the presence of moisture and ultra-violet light of a curable liquid polysulfide polymer based sealant composition which comprises the admixture with the uncured sealant, in an amount effective to insure adequate bonding of the cured sealant to a substrate, of a polybutyl polymer, a polybutene polymer or a mixture thereof; and an oil absorbent filler.

The invention further provides a cured rubbery like polymer, prepared by admixing a curable liquid polysulfide polymer, a curing amount of an oxidative curing agent, a polybutyl polymer, a polybutene polymer latex, or a mixture thereof in an amount effective to insure adequate bonding of said cured rubber like polymer to a substrate, and an oil absorbent filler.

The tangible embodiments of this aspect of the invention possess the inherent applied use characteristics of being sealants improved adhesiveness to glass.

The invention further provides an improved article of manufacture requiring a sealant on at least one surface thereof; wherein the improvement comprises said sealant being a curable liquid polysulfide polymer based sealant composition, containing as an adhesive additive, a polybutyl polymer latex, a polybutene polymer latex, or a mixture thereof, and an oil absorbent filler.

DESCRIPTION OF THE PREFERRED EMBODIMENT

The liquid polysulfide polymer based sealant compositions of the invention may be readily prepared. The admixture of the liquid polysulfide polymer and the polybutyl polymer, polybutene polymer or a mixture thereof, and the oil absorbent filler is readily accomplished by standard techniques. Other optional ingredients such as plasticizers or U.V. stabilizers and the like may be incorporated at the same time. The sealants may be packaged as two-part sealants, that is, the polysulfide-polybutyl or polybutene containing portion of the sealant will make up one package, and an oxidative curing agent may be separately packaged and the two mixed just prior to use. If a water emulsion of the adhesive additive is employed to formulate the sealant, a one package format may be employed. The oxidative curing agent may then be incorporated at the time as the rest of the formulation is mixed and packaged.

The polysulfide liquid polymers suitable for use in the present invention are the standard polysulfide polymers of commerce ranging in molecular weight from about 500 to 7500, those about 1000 to about 4000 particularly those of 4000 molecular weight are specially preferred. These polysulfide polymers are described in U.S. Pat. No. 2,466,963 and they may be represented by the formula HS—(RSS)$_n$—RSH where R is a hydrocarbon, oxahydrocarbon or thiahydrocarbon radical such as the ethyl formal radical (—CH$_2$—CH$_2$—O—CH$_2$—O—CH$_2$—CH$_2$—)$_n$, the butyl formal radical (—CH$_2$—CH$_2$—CH$_2$—CH$_2$—O—CH$_2$—O—CH$_2$—CH$_2$—CH$_2$—CH$_2$—)$_n$, the ethylether diradical (—CH$_2$—CH$_2$—O—CH$_2$—CH$_2$—)$_n$ and the butylether diradical (—CH$_2$—CH$_2$—CH$_2$—CH$_2$—O—CH$_2$—CH$_2$—CH$_2$—CH$_2$—)$_n$ and $n$ will vary from about 4 to about 23. If desired, in addition to these thio terminated liquid polythio polymers some polysulfide polymers wherein the terminal thio groups have been inverted by treatment with heat and acid to hydroxyl terminals may be admixed.

The polybutyl and polybutene polymers suitable for use in the invention are any of the solid latices or liquid butyl or butene polymers which are commonly available. They may either be fully cured or have a minor fraction of sites available for further curing. The proportion of sites available for further curing may range from about 1% to about 10% preferably about 4%. The polymers may either be liquids, solids dispersed in the form of a latex or liquids dispersed in a solvent as an emulsion. Particularly suitable are such products as Polyvis 2000 SH manufactured by Cosden Oil and Chemical Company, a liquid 100% solid non-curing polybutene, Butyl LM 430 manufactured by Exxon-Enjay Chemical Company a 3 to 1 emulsion in toluene of a 4% curing site butyl liquid polymer, and Exxon BP 100 Butyl latex, a non-curing 63% solid emulsion in water. They may conveniently be incorporated in qualities ranging from about 1 to 200 parts more preferably 10 to 100 parts per 100 parts of polysulfide liquid polymer in the formulation.

The oil absorbent filler, used in the present invention to provide capatibility between the polysulfide polymer and the polybutyl or polybutene polymer, may be selected from among any non-acidic oil absorbent material commonly employed as fillers in compositions of this general type. Typical materials suitable for this purpose are: calcium carbonate, magnesium oxide, kaolin, other non-acidic clays, titanium dioxide and carbon black. A particular filler is not especially critical as long as one is employed, and will typically be selected by one skilled in the art to impart the particular combination of stiffness, workability, lack of slump in the uncured state, as well as hardness and curing time desired for the particular application. In addition other additives assisting in the control of the above as well as other properties may be incorporated. Typical of such additives are plasticizers such as chlorinated paraffins, sag control agents derived from castor oil derivatives, phthalate ester plasticizers which also serve to control fogging, pH control agents such as tridimethylaminophenol, and adhesion enhancers such as γ -glycidoxypropyltrimethoxysilane. Conventional curing agents may be incorporated directly into the sealant formulation when it is formulated with a water based butyl or butene latex to form a one package sealant. Typical of these sealants are $MnO_2$ and $PbO_2$ or mixtures thereof. If a polymer containing unsaturated curing sites is incorporated in the sealant a curing agent for this polymer may be incorporated also. Curing agents such as paraquinonedioxime and $PbO_2$, or t-butyl perbenzoate and $PbO_2$ are convenient. The curing agent may also be packaged separately to form a two part sealant. Typically curing agents suitable for the one part sealant may also be employed for the two part sealant.

The one part sealants, or the two part sealants after mixing, may be applied to the desired substrate by conventional means commonly by extrusion from a caulking gun. The substrates to which they may be applied may be singly or in combination comprised of siliceous materials such as glass, metals, or concrete and the like.

The following examples further illustrate the best mode contemplated by the inventor for the practice of his invention.

EXAMPLE 1

A sealant formulation containing the following ingredients is prepared:

| Ingredients | Parts by Weight |
|---|---|
| Liquid bis-dichloroethyl formal based polysulfide polymer, average M.W. 4000 average cross-linking 0.5% | 100 |
| Butyl latex (fully cured 63% solids emulsion in water) | 159 |
| $CaCO_3$ | 200 |
| Low oil absorbtion $TiO_2$ | 10 |
| Alkyl aryl polyether alcohol (Rohm & Haas Triton X-100) | 0.5 |
| 20% $MnO_2$ in 51% chlorinated paraffin plasticizer (ICI Cerechlor 51L) | 20 |
| Total | 489.5 |
| Liquid polysulfide polymer/butyl polymer (solids/solids) | 100/100 |
| Total % solids | 88.1 |

This mixture remains as a stable one package sealant until such time as it is applied to a substrate and the water permitted to evaporate. The following physical properties are possessed by this formulation:

Initial
 Consistency; Medium ease of extrusion, good wet adhesion, no sag in horizontal position.

| | |
|---|---|
| Hardness: Shore A Duro (1 day) | 15.20 |
| (Ultimate) | 30 |
| Tensile (psi/elongation (%)(est.) | |
| (1 day) | 80/1400 |
| (ultimate) | 125/1500 |
| Time to tack free surface (minutes) | 15 |

After Heat Aging 1 week at 158° F
 Consistency: Between medium and firm, medium to moderate resistance to extrusion, adequate wet adhesion.

| | |
|---|---|
| Hardness: Shore A Duro (1 day) | 15–20 |
| (ultimate) | 30–32 |
| Tensile (psi)/elongation (%) (est.) | |
| (1 day) | 80/1600 |
| (ultimate) | 90/1400 |

This formulation shows good adherence to glass upon cure, improved adhesion to concrete after immersion, a low modulus but high ultimate tensile strength. Because of the water in the formulation there is some shrinkage on drying, but less than in acrylic, vinyl, and butyl latex or solvent containing sealants. Evaporation of water apparently leaves the cured sealant microporous so that it is somewhat permeable to water vapor. Characteristic of butyl containing caulks the surface retains some residual tack on drying.

EXAMPLE 2

Two part sealant formulations containing the following ingredients are prepared:

| | Parts by Weight | | | |
|---|---|---|---|---|
| | 1 | 2 | 3 | Control |
| Liquid bis-dichloroethylformal based polysulfide polymer, average M.W. 4000, average cross-linking 0.5% | 100 | 100 | 100 | 100 |
| Calcium carbonate | 45 | 45 | 45 | 45 |
| Titanium dioxide | 15 | 15 | 15 | 15 |
| Stearic Acid | 0.5 | 0.5 | 0.5 | 0.3 |
| Castor oil derivative sag control agent (Baker Thixcin GR) | 10 | 10 | 10 | 10 |
| γ-glycidoxy propyl-trimethoxy silane (Union Carbide Silane A-187) | 3 | 3 | 3 | 3 |
| Saturated polybutene (100% solids, viscous liquid) (Cosden polyvis 200 SH) | 20 | 35 | 50 | — |
| Part A Total | 198.5 | 213.5 | 228.5 | 191 |
| $MnO_2$--D Grade | | | 10 | |
| Phthalate plasticizer (Monsanto, Santicizer S-278 | | | 10 | |
| Carbon black | | | 0.6 | |

-continued

|  | Parts by Weight | | | |
|---|---|---|---|---|
|  | 1 | 2 | 3 | Control |
| Part B Total |  | 20.6 |  |  |

Upon mixing Part A and Part B the sealants exhibited the following properties:

|  | 1 | 2 | 3 | Control |
|---|---|---|---|---|
| Work Life (Min.) | 120 | 90 | 420 | 255 |
| Tensile (Instron) (psi) | 90 | 85 | 50 | 150 |
| Modulus (psi):100% | 75 | 66 | 38 | 123 |
| :200% | — | — | — | — |
| Elongation (ultimate) (%) | 170 | 165 | 170 | 160 |
| Durometer (Shore A) |  |  |  |  |
| :1 day | 32 | 26 | 8 | 35 |
| :1 week | 36 | 30 | 20 | 40 |
| :Ultimate | 38 | 35 | 22 | 48 |
| Adhesion to glass: |  |  |  |  |
| :1 week (room temp.) | cohesive | cohesive | CF* | cohesive |
| :plus 1 week exposure $H_2O$ and U.V. light | cohesive | cohesive | CF | — |
| Moisture vapor transmission (g./m²/24 hrs.) | 9.1 | 5.4 | 3.5 | 8–12 |

*very heavy film, almost cohesive

Upon cure the sealants containing polybutene polymer retained tack similar to that of the sealant of Example 1.

EXAMPLE 3

Sealant compositions prepared in the same proportions as Example 2 but incorporating 0.6 parts by weight stearic acid in Part B when mixed gave identical properties to the sealant of Example 2 except that on testing for adhesion to glass the following results were found.

|  | Sealant | | | |
|---|---|---|---|---|
| Adhesion to Glass | 1 | 2 | 3 | Control |
| 1 week at room temperature | cohesive | cohesive | cohesive¹ film | cohesive |
| plus 102 hours exposure to water and U.V. light | cohesive | cohesive | cohesive film | cohesive (Short) |
| plus 225 hours exposure to water and U.V. light | cohesive (Short) | cohesive film | cohesive film | cohesive (Short) |
| Moisture vapor transmission (g./m²/24 hours) | 6.5 | 4.3 | 3.4 | 11.5 |

¹Very heavy film (almost cohesive)

EXAMPLE 4

Sealant compositions are prepared containing the following ingredients:

|  | Parts by Weight | | | |
|---|---|---|---|---|
|  | 1 | 2 | 3 | 4 |
| Liquid polysulfide polymer as in Examples 1 and 2 | 100 | 100 | 100 | 100 |
| Calcium carbonate | 45 | 45 | 45 | 45 |
| Titanium dioxide | 15 | 15 | 15 | 15 |
| Castor oil derivative (Baker Thixcin GR) | 10 | 10 | 10 | 10 |
| 4% unsaturated butyl liquid polymer in toluene (3:1) (Exxon, Enjay Chemical, LM 430) | 27 | 23 | 33 | 23 |
| Saturated polybutene liquid polymer as in Example 2 | 5 | 18 | 25 | 18 |
| γ-glycidoxypropyl-trimethoxy silane | 3 | 3 | 3 | 1.5 |
| Liquid polysulfide polymer average MW 1000, 2% cross link inverted to OH terminals | — | — | — | 1.5 |
| $MnO_2$/phthalate plasticizer/carbon black/(Monsanto S-278) stearic acid (10/10/0.6/0.6) | 21 | 21 | 21 | 21 |
| p-quinone dioxime | 0.9 | 0.8 | 1.2 | 0.8 |

These formulations exhibited the following properties:

|  | 1 | 2 | 3 | 4 |
|---|---|---|---|---|
| Work Life (minutes) | 55 | 55 | 75 | 75 |
| Tensile (Instron) (psi) | 151 | 126 | 100 | 131 |
| Modulus (psi) : 100% | 100 | 80 | 60 | 71 |
| : 200% | 146 | 112 | 88 | 105 |
| Elongation (ultimate) | 220 | 260 | 270 | 290 |
| Durometer (Shore A) |  |  |  |  |
| : 1 day | 30 | 22 | 20 | 30 |
| : 1 week | 40 | 35 | 33 | 35 |
| Adhesion to Glass |  |  |  |  |
| 1 week room temperature | cohesive | cohesive | cohesive¹ film | cohesive |
| + 104 hours exposure $H_2O$ + U.V. | cohesive | cohesive | cohesive film | cohesive |
| + 250 hours exposure $H_2O$ + U.V. | cohesive | cohesive | cohesive film | cohesive |
| Moisture vapor transmission (g./m²/24 hours) | 6.9 | 4.9 | 4.1 | 5.4 |
| Surface Tack: 1 day | none | none | slight | none |
| : 1 week | none | none | slight | none |

¹Viscous film, virtually cohesive.

EXAMPLE 5

Sealant compositions are prepared containing the following ingredients:

|  | 1 | 2 | 3 | 4 | 5 | 6 | 7 | 8 |
|---|---|---|---|---|---|---|---|---|
| Liquid polysulfide polymer as in Example 1 | 100 | 100 | 100 | 100 | 100 | 100 | 100 | 100 |
| Calcium carbonate | 45 | 45 | 45 | 45 | 45 | 45 | 45 | 45 |
| Titanium dioxide | 15 | 15 | 15 | 15 | 15 | 15 | 15 | 15 |
| Stearic Acid | 0.3 | 0.3 | 0.3 | 0.3 | 0.3 | 0.3 | 0.3 | 0.3 |
| Castor oil derivative (Baker Thixcin GR) | 10 | 10 | 10 | 10 | 10 | 10 | 10 | 10 |
| Butyl liquid polymer unsaturation (4%) in toluene (3:1) (Enjay Chemical Butyl LM 430) | 35 | 35 | 35 | 35 | 35 | 35 | 40 | 40 |
| γ-glycidoxypropyl-tri-methoxy-silane | — | 3 | — | 1.5 | — | 3 | 3 | 1.5 |
| Liquid polysulfide polymer inverted to OH terminals as in Example 4 | — | — | 1.5 | 1.5 | — | 1.5 | — | 1.5 |
| Epichlorohydrin resin (Shell Epon)/inverted polysulfide resin as above (1/0.5) | — | — | — | — | 3 | — | — | — |

-continued

|  | 1 | 2 | 3 | 4 | 5 | 6 | 7 | 8 |
|---|---|---|---|---|---|---|---|---|
| MnO$_2$/phthalate plasticizer (Monsanto santicizer S-278)/ carbon black (10/10/0.6) | 21 | 21 | 21 | 21 | 21 | 21 | 21 | 21 |
| p-quinone dioxime | 2 | 2 | 2 | 2 | 2 | 2 | 2 | 2 |
| Tridimethylaminomethylphenol | — | — | — | — | 0.2 | — | — | — |

The consistency of all formulation ranged from moderate to moderately firm. All were acceptable. None of the above formulations possessed any surface tack after 1 week. In addition, they possessed the following properties:

|  | 1 | 2 | 3 | 4 | 5 | 6 | 7 | 8 |
|---|---|---|---|---|---|---|---|---|
| Work Life (min.) | 35 | 50 | 45 | 50 | 5 | 60 | 50 | 50 |
| Tensile (psi/Elongation(%) | | | | | | | | |
| :1 week | — | 110/380 | — | — | — | — | 87/470 | 90/380 |
| :1 week (EST) | 200/300 | 200/500 | 180/900 | 180/690 | 180/790 | 180/600 | 180/600 | 150/610 |
| Durometer (Shore A) | | | | | | | | |
| :1 day | 22 | 12 | 20 | 12 | 18 | 10 | 8 | 12 |
| :1 week | 38 | 32 | 30 | 30 | 30 | 25 | 30 | 23 |
| :3 weeks | 45 | 43 | 45 | 41 | 40 | 36 | 37 | 30 |
| Adhesion to Concrete (Qualitative Beads) | | | | | | | | |
| :1 wk RT | Coh | Coh | Coh | Coh | Coh | Coh | Coh | Coh |
| : above + 1 wk H$_2$O immersion | NA | Coh Film | Coh/ Adh | Adh | Coh/ Adh | Adh | Coh | Adh/ Coh |
| Adhesion to Glass (Qualitative Beads) | | | | | | | | |
| :1 week at RT | NA | Coh | Coh/ Adh | Coh | Coh | Coh | Coh | Coh |
| :+ 108 hours exposure to H$_2$O and U.V. | Adh | | Adh | Coh Film | v.thin Coh Film | Coh | Coh | Coh Film |
| :+ 200 hours exposure to H$_2$O and U.V. | Adh | | Adh | Coh Film | v.thin Coh Film | Coh | Coh | Coh Film |

EXAMPLE 6

Sealant compositions are prepared from the following ingredients:

|  | 1 | 2 |
|---|---|---|
| Liquid polysulfide polymer as in Ex. 1 | 100 | 100 |
| Calcium carbonate | 45 | 45 |
| Titanium dioxide | 15 | 15 |
| Castor oil derivative (Baker Thixcin GR) | 10 | 10 |
| Phthalate plasticizer (Monsanto santicizer S-278) | 25 | — |
| (3:1) (Exxon Butyl LM 430) | — | 33 |
| γ-glycidoxypropyl-trimethoxy silane | 2 | 2 |
| Inverted polysulfide polymer as in Ex. 4 | 1 | 1 |
| p-quinone dioxime | — | 2 |
| 2,4-dihydroxy benzophenone | 2 | 2 |
| naphthyl triazole | 2 | 2 |
| MnO$_2$/santicizer 278/carbon black/stearic acid (10/10/0.6/0.6) | 16 | 16 |
| PbO$_2$/poly-α-methyl styrene plasticizer (Dow V-276) (7.5/7.5) | 4 | 4 |

These compositions have the properties shown:

|  | 1 | 2 |
|---|---|---|
| Durometer, Shore A | | |
| :1 day | 10 | 42 |
| :1 week | 30 | 42 |
| Moisture vapor transmission (Gms/Day/Meter$^2$) | 8.0 | 5.2 |
| Tensile (psi) | 161 | 152 |
| Elongation (%) | 310 | 400 |
| Modulus 100% | 91 | 65 |
| 200% | 127 | 93 |
| Adhesion:Beads on Glass: | | |
| :Wet UV: (After 1 wk cure RT) | Coh | Coh |
| 1 week | NA | Coh |
| 2 weeks | — | Coh |
| 3 weeks | — | Coh |
| 4 weeks | — | Coh |
| 6 weeks | — | Coh |
| 8 weeks | — | Coh |
| :Water vapor, UV after 1 week cure (RT) | Coh | Coh |
| 108 hours | Coh- Film | Coh |
| 200 hours | Coh- Film | Coh |
| 400 hours | Coh- Film Adh | Coh- Film |

EXAMPLE 7

Sealant formulations containing the ingredients shown are prepared:

|  | 1 | 2 | 3 | 4 | 5 |
|---|---|---|---|---|---|
| Liquid polysulfide polymer as in Example 1 | 100 | 100 | 100 | 200 | 200 |
| Saturated polybutene (viscous liquid polymer) (Cosden polyvis 200 SH | 300 | 300 | 200 | 200 | 100 |
| Butyl liquid polymer in toluene (3/1) (4% uncured) Enjay Butyl LM 430) | 100 | 100 | 200 | 100 | 200 |
| Calcium carbonate | 200 | 300 | 300 | 300 | 300 |
| p-quinone dioxime | 3.5 | 3.5 | 7 | 7 | 7 |
| Toluene | — | 50 | 50 | 50 | 50 |
| PbO$_2$/poly-α-methyl styrene plasticizer (Dow V-276) (7.5/7.5) | 15 | — | — | — | — |
| MnO$_2$/phthalate plasticizer (Monsanto santicizer S-278)/ carbon black (10/10/0.6) | — | 21 | 21 | 21 | 21 |

The formulations possessed the following properties: All formulations had a moderate consistency with good gunnability to a well formed easily curable bead.

|  | 1 | 2 | 3 | 4 | 5 |
|---|---|---|---|---|---|
| Tensile (psi)/ Elong. (%) | | | | | |
| :1 day | 0/50 | 20/200–650 | 10/200 | 20/90 | 20/100 |
| :1 week | 0/200 | 25/320 | 100/225 | 40/90 | 90/200 |
| Durometer (Shore A) | | | | | |
| :1 day | 5 | 5 | 10 | 17 | 20 |
| :1 week | 3 | 10 | 23 | 30 | 36 |
| Surface Tack | | | | | |
| :1 day | v. tacky | sl. | | sl. | sl. |

-continued

| | 1 | 2 | 3 | 4 | 5 |
|---|---|---|---|---|---|
| :1 week | tacky v. tacky | tacky | tack v.sl. tack | tack dry | tack dry |

The subject matter which applicant regards as his invention is particularly pointed out and claimed as follows:

1. A polysulfide based sealant composition which comprises:
   a. a curable liquid polysulfide polymer of the formula HS—(RSS)$_n$—RSH wherein R is a hydrocarbon, oxahydrocarbon or thiahydrocarbon radical and $n$ is from 4 to about 23;
   b. a butyl rubber, a polybutene polymer, or a mixture thereof as an adhesive additive; and
   c. an oil absorbent filler.

2. A process for the enhancement of adhesiveness of a sealant composition based on a curable liquid polysulfide polymer of the formula HS—(RSS)$_n$—RSH wherein R is a hydrocarbon, oxahydrocarbon, or thiahydrocarbon radical and n is from 4 to about 23, which comprises the admixture with the uncured sealant, in an amount effective to insure adequate bonding of the uncured sealant to a substrate, of a butyl rubber, a polybutene polymer, or a mixture thereof.

3. A cured rubber-like polymer derived from a composition comprising a curable liquid polysulfide polymer of the formula HS—(RSS)$_n$—RSH wherein R is a hydrocarbon, oxahydrocarbon, or thiahydrocarbon radical and n is from 4 to about 23, an oil absorbent filler, an oxidative curing agent, and in an amount effective to insure bonding of said cured rubber-like polymer to a substrate, a butyl rubber, a polybutene polymer, or a mixture thereof.

4. In an improved article of manufacture requiring a sealant on at least one surface thereof, the improvement which comprises said sealant being based on a curable liquid polysulfide polymer of the formula HS—(RSS)$_n$—RSH wherein R is a hydrocarbon, oxahydrocarbon, or thiahydrocarbon radical and n is 4 to about 23, and containing as an adhesive additive a butyl rubber, a polybutene polymer, or a mixture thereof.

5. A sealant composition as defined in claim 1 wherein the adhesive additive comprises a polybutyl polymer.

6. A sealant composition as defined in claim 1 wherein the adhesive additive comprises a polybutene polymer.

7. A sealant composition as defined in claim 1 wherein the adhesive additive comprises a polybutyl polymer and a polybutene polymer.

8. A sealant composition as defined in claim 1 wherein the polybutyl polymer contains a minor fraction of curing sites.

9. A process as defined in claim 2 wherein a polybutyl polymer is added to the uncured sealant.

10. A process as defined in claim 9 wherein a polybutene polymer is added to the uncured sealant.

11. A process as defined in claim 9 wherein a polybutyl polymer and a polybutene polymer are added to the uncured sealant.

12. A process as defined in claim 11 wherein the polybutyl polymer has a minor fraction of curing sites.

13. A product as defined in claim 3 wherein a polybutyl polymer is incorporated into the mixture from which said product is derived.

14. A product as defined in claim 3 wherein a polybutene polymer is incorporated into the mixture from which said product is derived.

15. A product as defined in claim 3 wherein a polybutyl polymer, and a polybutene polymer are incorporated into the mixture from which said product is derived.

16. An improved article of manufacture as defined in claim 4 wherein the adhesive additive is a polybutyl polymer.

17. An improved article of manufacture as defined in claim 4 wherein the adhesive additive is a polybutene polymer.

18. An improved article of manufacture as defined in claim 4 wherein the adhesive additive is a polybutyl polymer latex and a polybutene polymer.

19. An improved article of manufacture as defined in claim 18 wherein the polybutyl polymer contains a minor fraction of curing sites.

20. A sealant composition as defined in claim 5 wherein the butyl polymer is a liquid polymer containing a minor fraction of curing sites.

21. A process as defined in claim 9 wherein the polybutyl polymer is a liquid polymer containing a minor fraction of curing sites.

22. A product as defined in claim 13 wherein the polybutyl polymer is a liquid polymer containing a minor fraction of curing sites.

23. An article of manufacture as defined in claim 16 wherein the polybutyl polymer is a liquid polymer containing a minor fraction of curing sites.

* * * * *

Disclaimer 4,060,570.—*Henry N. Paul, III,* Blue Bell, Pa. CURABLE LIQUID POLYSULFIDE POLYMER BASED SEALANTS. Patent dated Nov. 29, 1977. Disclaimer filed Mar. 29, 1982, by the assignee, *Thiokol Corp.*

Hereby enters this disclaimer to claims 1, 2, 3, 4, 5, 6, 9, 10, 13, 14, 16 and 17 of said patent.

[*Official Gazette May 25, 1982.*]